United States Patent
Zuerner

(10) Patent No.: US 10,523,531 B2
(45) Date of Patent: Dec. 31, 2019

(54) SDN-BASED API CONTROLLER

(71) Applicant: Verizon Deutschland GmbH, Dortmund (DE)

(72) Inventor: Helmut Zuerner, Dortmund (DE)

(73) Assignee: VERIZON DEUTSCHLAND GMBH, Dortmund (DE)

( * ) Notice: Subject to any disclaimer, the term of this patent is extended or adjusted under 35 U.S.C. 154(b) by 109 days.

(21) Appl. No.: 15/352,273

(22) Filed: Nov. 15, 2016

(65) Prior Publication Data

US 2018/0139109 A1 May 17, 2018

(51) Int. Cl.
*H04L 12/24* (2006.01)

(52) U.S. Cl.
CPC ...... *H04L 41/5051* (2013.01); *H04L 41/5054* (2013.01); *H04L 41/0893* (2013.01)

(58) Field of Classification Search
CPC .................................................. H04L 41/5051
See application file for complete search history.

(56) References Cited

U.S. PATENT DOCUMENTS

| | | | | |
|---|---|---|---|---|
| 2004/0236633 | A1* | 11/2004 | Knauerhase | G06Q 10/0631 705/26.8 |
| 2005/0197990 | A1* | 9/2005 | Wu | G06F 17/30566 706/48 |
| 2006/0265720 | A1* | 11/2006 | Cai | H04L 67/16 719/330 |
| 2012/0254899 | A1* | 10/2012 | Sharma | G06F 9/541 719/328 |
| 2014/0089383 | A1* | 3/2014 | Hong | H04L 67/16 709/203 |
| 2015/0229719 | A1* | 8/2015 | Sella | H04L 47/33 709/217 |
| 2016/0057207 | A1* | 2/2016 | Li | H04N 21/4431 709/203 |
| 2016/0165010 | A1* | 6/2016 | Bacovsky | H04L 67/42 709/203 |

* cited by examiner

*Primary Examiner* — Andrew C Georgandellis

(57) ABSTRACT

Techniques, described herein, may enable a software defined network (SDN) to determine application program interfaces (APIs) for providing network services. For instance, when a customer submits a request to access media content (e.g., images, music, videos, etc.), the SDN may determine the APIs to enable the network service to be provided to the user with little or no operator involvement. In some implementations, the APIs may be derived by the network dynamically. In some implementations, the APIs may be derived from API records that are stored by the SDN. Additionally, when new APIs are derived for a network service, the APIs may be recorded in case the same request for network services is later received (e.g., from another customer) in which case the record may be promptly used to determine the appropriate APIs for the requested network service.

20 Claims, 14 Drawing Sheets

805

810

SDN-BASED API CONTROLLER

BACKGROUND

Operating a telecommunications network (and/or other types of networks) can include providing a wide range of network services. Examples of such services may include providing authentication and authorization services, monitoring network performance, managing network resources, tracking network usage, implementing charging policies, and more. Providing such network services may include implementing application program interfaces (APIs) that enable functions and devices, within the network, to communicate with one another.

BRIEF DESCRIPTION OF THE DRAWINGS

Embodiments of the present disclosure will be readily understood by the following detailed description in conjunction with the accompanying drawings. To facilitate this description, like reference numerals may designate like structural elements. Embodiments of the disclosure are illustrated by way of example and not by way of limitation in the figures of the accompanying drawings.

DETAILED DESCRIPTION OF PREFERRED EMBODIMENTS

Figure 1:
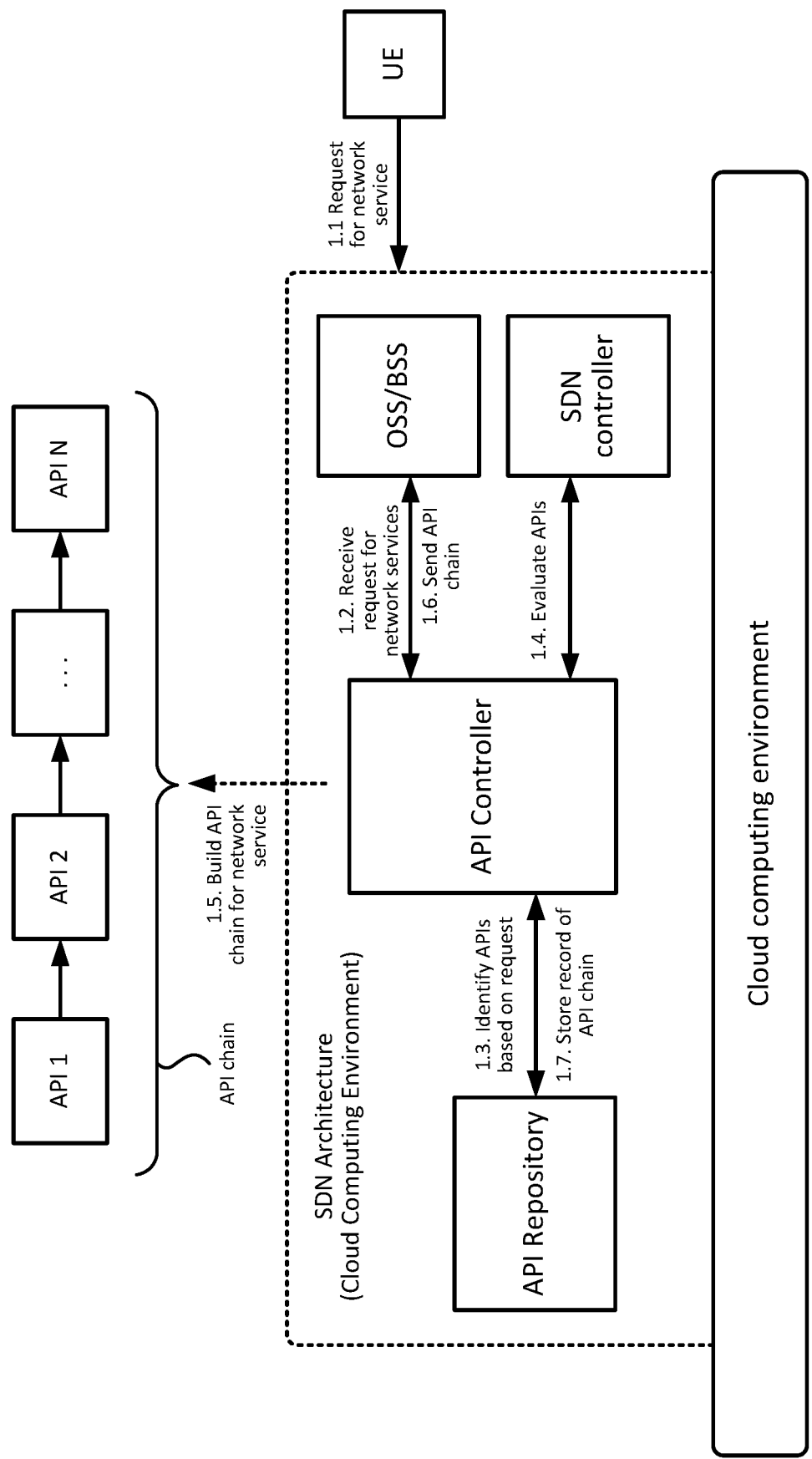
FIG. 1 illustrates an example overview of an implementation described herein.

The following detailed description refers to the accompanying drawings. The same reference numbers in different drawings may identify the same or similar elements. It is to be understood that other embodiments may be utilized and structural or logical changes may be made without departing from the scope of the present disclosure. Therefore, the following detailed description is not to be taken in a limiting sense, and the scope of embodiments in accordance with the appended claims and their equivalents.

Telecommunication networks (and other types of networks) may include a collection of interconnected computing and communication devices (e.g., routers, gateways, servers, access points, etc.) with discrete functions (e.g., authentication, authorization, security, account management, network access services, resource allocation, etc.) and domains. In some networks, one or more features or functions of the network may be virtualized within a cloud computing environment. A cloud computing environment may include a cluster of server devices that share resources (e.g., processing capacity, memory capacity, server capacity, etc.) to host processes corresponding to virtualized network devices and/or functions. Virtualizing a network function in a cloud computing environment may provide several benefits, such as scalability, centralized monitoring and management, efficient use of network resources, and/or other benefits.

A network function that is implemented by a physical device may be referred to as a physical network function (PNF). By contrast, a network function that is implemented by a virtualized function or device may be referred to as a virtual network function (VNF). Network functions, whether implemented as PNFs, VNFs, or a combination thereof, may provide network services. Examples of network services may include network access and routing services, authentication and authorization services, quality of service (QoS) services, account management services, usage monitoring services, billing services, load balancing services, data storage services, and/or other types of services.

Implementing network functions and/or network services (by, for example, gluing together different network functions (e.g., cloud functions, security functions, Information Technology (IT) functions, etc.) may involve application program interfaces (APIs) that enable the functions and/or services to communicate and otherwise interact with one another. An API may include computer code that gives applications, functions, or users access to certain features of a system, without necessarily knowing many details about internal system architectures, structures, protocols used, etc. An API may provide an interface for accessing such features and enabling otherwise incompatible systems to communicate with one another. The quantity and types of APIs may vary based on the network service being provided. For example, a user device accessing user account information may involve a single API to enable the user device to obtain the user account information from an appropriate network function. By contrast, a user ordering a data streaming services may involve APIs, for updating user account information, updating billing information for the user, configuring one or more PNFs or VNFs to accommodate the streaming service, etc. Unless appropriate APIs are implemented, network functions and/or devices may not be capable of providing a particular network service.

Techniques describe herein enable a SDN to automatically determine APIs for providing a particular network service via the SDN. For instance, when a customer submits a request to access media content (e.g., images, music, videos, movies, etc.), the techniques described herein may determine the APIs to enable the network service to be provided to the user with little or no operator involvement. In some implementations, the SDN may provide services to such a large number of customers that changes to the SDN may be very frequent, thereby highlighting the need and benefit of a SDN that is fully automated in terms of implementing such changes (which may include APIs) without operator involvement. Furthermore, while some of the SDNs described herein may be described within the context of supporting a telecommunications network (e.g., 4G, 5G, etc.) the SDNs described herein are not limited to telecommunications network and may be applicable to other types of networks as well. In some implementations, the APIs may be dynamically derived by the network. In other implementations, the APIs may be derived from API records that are stored by the network. Additionally, when new APIs are derived for a particular network service, the APIs may be recorded in case a similar network service request (e.g., from another user) is received, in which case the record may be promptly used to determine the appropriate API, or set of APIs, for the requested network service.

For example, a user may request network streaming services. In response to such a request, an SDN may identify network events, conditions, modifications, etc., that are to occur in order to provide the service (e.g., identify the streaming service, resolution/codecs of videos, lengths of videos, subscription parameters with the streaming provider, subscription parameters with the Internet Service Provider (ISP)/telecommunications provider, etc.). In addition, the SDN controller may identify the APIs that may be used to obtain this information and/or modify the SDN (and virtual functions of the SDN) in order to provide such a service.

In some implementations, the API request (e.g., a name, an ID, or another type of information in the request) may correspond to network interactions, communications, events, etc., that are to occur in order to provide the network service. The chain of network interactions, communications, events, etc., may be stored in libraries/repositories of the SDN. APIs may be derived based on the characteristics of each of the interactions, communications, events, etc., being mapped to characteristics of APIs (also stored in libraries/repositories of the SDN architecture.

FIG. 1 illustrates an example overview of an implementation described herein. As shown, a SDN architecture may be implemented in a cloud computing environment. The SDN architecture may include several processes that are hosted by the cloud computing servers. As shown, an API controller, an Operations Support Systems and Business Support Systems (OSS/BSS) component, and a SDN controller are examples of such processes. A brief description of the function of these SDN processes (also referred to as "nodes") are provided with reference to FIG. 1. A more detailed description of these processes is provided below with respect to FIG. 3.

As shown, a user equipment (UE), such as a mobile telephone, may send a request for a network service (e.g., one or more network access services, call services, account management services, etc.) to the SDN architecture (at 1.1). In response, the OSS/BSS may provide the request to the API controller to determine the APIs that will be used in providing the requested service (at 1.2). Based on the request, the API controller may communicate with the API repository to identify the APIs that that will enable the network service to be implemented (at 1.3). For example, in some implementations, the API controller may determine the appropriate APIs for the network service by characterizing the service being requested, and matching the characteristics of the service with characteristics of APIs in the API repository.

In some implementations, the API controller may communicate with the SDN controller to verify that the APIs identified are viable for implementing the network service and/or to help choose between more than one API that could be used to implement the network service (or a particular aspect of the network service) (at 1.4). The API controller may build an API chain for the network service based on the APIs from the API repository and the communications with the SDN controller (at 1.5). The API chain may include a sequence of APIs (e.g., API 1, API 2, etc.) that parallel the sequence of network functions or interactions used to provide the network service. The API controller may communicate the API chain to the OSS/BSS (at 1.6) so that the SDN architecture may proceed with implementing the service requested by the UE. The SDN controller may also create and store a record of the API chain in the API repository so that the SDN controller does not have to recreate the API chain if a subsequent request for the network service is later received (1.7).

Figure 2:
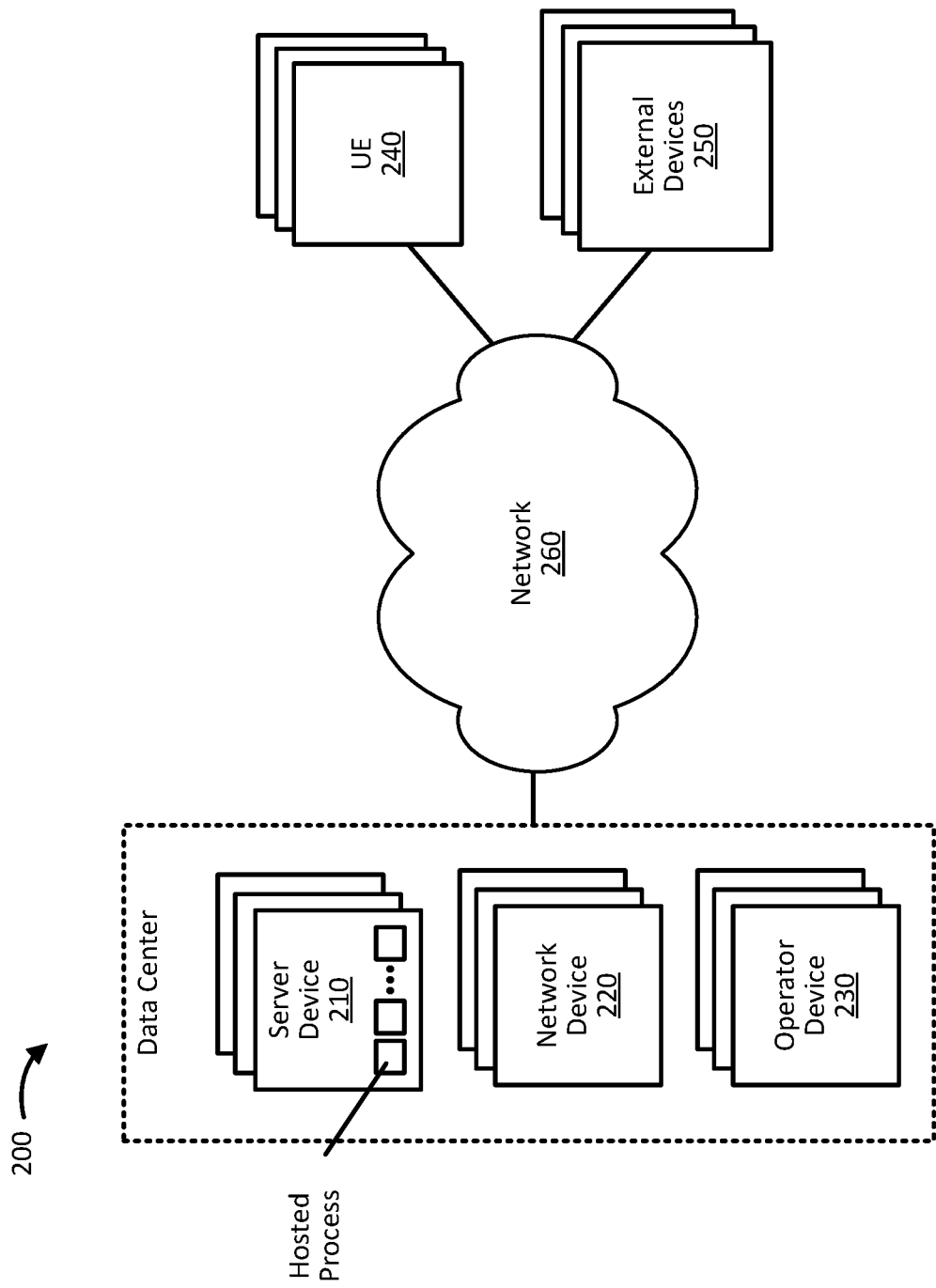
FIG. 2 illustrates an example environment in which systems and/or methods described herein may be implemented.

FIG. 2 is a diagram of an example environment 200 in which systems and/or methods described herein may be implemented. Environment 200 may include a data center that includes one or more server devices 210, network devices 220, and operator devices 230, in addition to UEs 240, external devices 250 and network 260.

The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another device of environment 200. Additionally, the devices of environment 200 may interconnect with each other, and/or other devices, via wired connections, wireless connections, or a combination of wired and wireless connections. In some implementations, one or more devices of environment 200 may be physically integrated in, and/or may be physically attached to, one or more other devices of environment 200. Also, while "direct" connections are shown in FIG. 2 between certain devices, some devices may communicate with each other via one or more additional devices and/or networks.

Server device 210 may include one or more computing devices, such as a single server device or a collection of server devices, capable of operating in a cloud computing environment. For example, server device 210 may include a computing device with an operating system and/or other software that enables server device 210 to create, deploy, monitor, and manage hosted processes, which may be arranged in different ways and configured to provide different network services. In some implementations, the hosted processes may be arranged and configured to provide a SDN architecture, a detailed example of which is discussed below with reference to FIG. 3.

Network device 220 may include one or more devices that facilitate or enable communications between various devices shown in environment 200 (e.g., server devices 210 and operator devices 220). Examples of network device 220 may include routers, modems, gateways, switches, hubs, etc. Network devices 220 may be arranged and configured to interconnect the server devices 210 and operator devices 230 in one or more ways, in addition to providing a connection between the data center and network 260. In some implementations, network device 220 may include network devices (e.g., routers, hubs, etc.) that are local to the data center (e.g., (within the same warehouse(s) as server devices 210.

Operator device 230 may include a computing and communication terminal. In some implementations, operator device 230 may include a portable device, such as a smart phone, a laptop computer, a tablet computer, etc. Operator device 230 may also include one or more non-portable computing devices, such as a desktop computer, a consumer or business appliance, or other devices that can connect to network 260. Operator device 230 may also include a computing and communication device that may be worn by a user (also referred to as wearable devices) as a watch, a fitness band, a necklace, glasses, an eyeglass, a ring, a belt, a headset, or another type of wearable device. Operator device 230 may provide a portal by which an operator may create, configure, monitor, and manage a SDN architecture that may be capable of intelligently and automatically determining API chains for services to be deployed by the SDN.

UE 240 may include a portable device, such as a smart phone, a laptop computer, a tablet computer, etc., that is outside the data center. UE 240 may also include non-portable computing devices, such as a desktop computer, a consumer or business appliance, or other devices that can connect to network 260. UE 240 may also include a computing and communication device that may be worn by a user (also referred to as wearable devices) as a watch, a fitness band, a necklace, glasses, an eyeglass, a ring, a belt, a headset, or another type of wearable device. As described herein, UE 240 may provide requests for network services (e.g., network access services, data services, calling services, etc.) to the SDN implemented by the hosted processes.

External devices 250 may include one or more computing and communication devices capable of communicating with the data center via network 260. In some implementations, external devices 250 may include remote operator devices that enable operators to interact with the devices in the data center. In some implementations, external devices may include a network device (e.g., a base station or a portion thereof) that is in communication with a core network implemented by the hosted processes of server devices 210. A more detailed example of a wireless telecommunication network implemented by hosted processes and external devices 250 is discussed below with reference to FIG. 4. In some implementations, external devices 250 may include devices that are located remotely (e.g., not within the warehouses of service devices 210) with respect to the data center.

Network 260 may include one or more wired and/or wireless networks. For example, network 260 may include a cellular network (e.g., a second generation (2G) network, a third generation (3G) network, a fourth generation (4G) network, a fifth generation (5G) network, a Long-Term Evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 260 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

Figure 3:
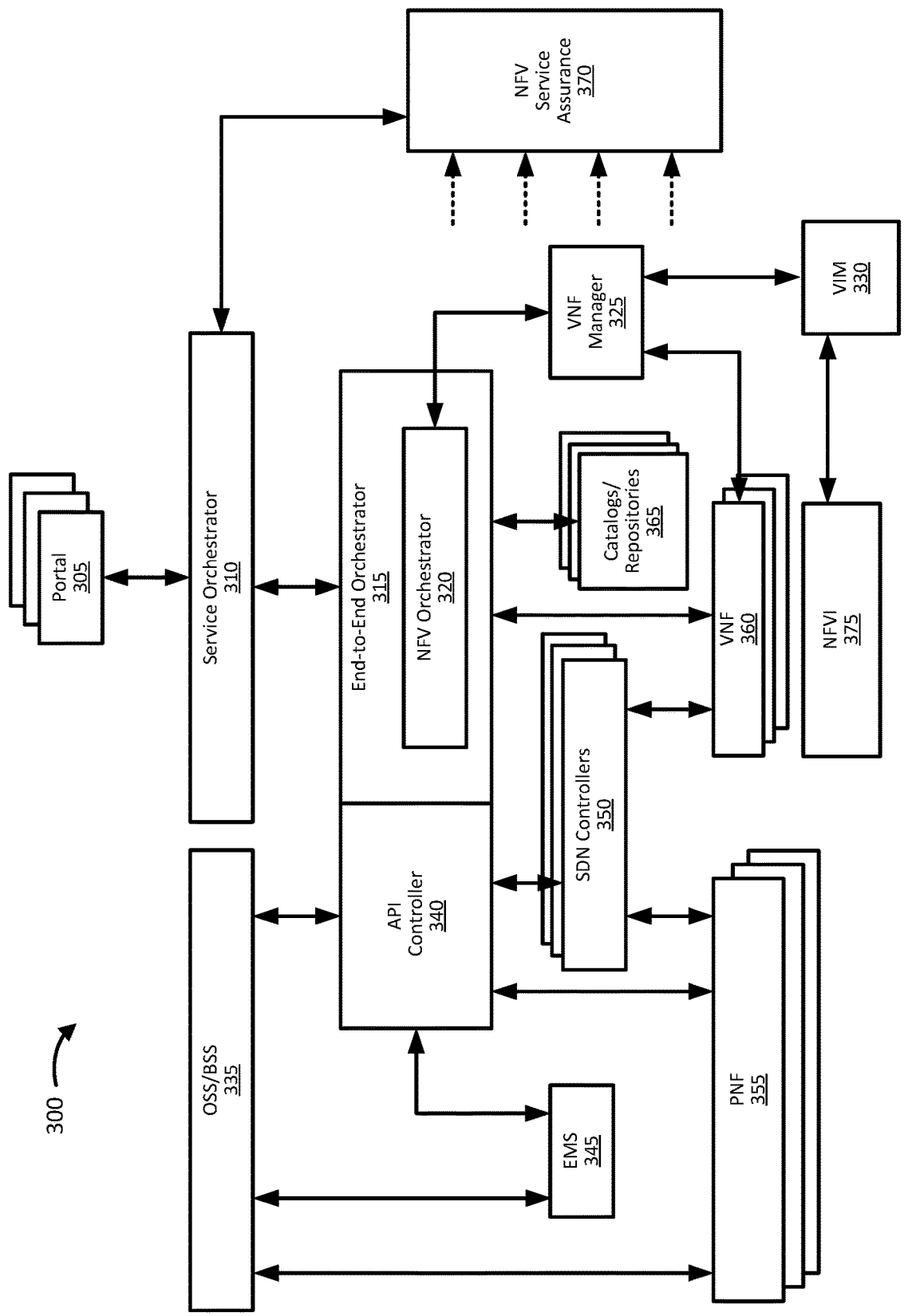
FIG. 3 illustrates an example software defined network (SDN) architecture.

FIG. 3 is a diagram of an example SDN architecture 300. As shown, SDN architecture 300 may include portals 305, service orchestrator 310, End-to-End orchestrator 315, network function virtualization (NFV) orchestrator 320, VNF manager 325, virtualized infrastructure manager (VIM) 330, OSS/BSS 335, API controller 340, Element Management System (EMS) 345, one or more SDN controllers 350, one or more physical network functions (PNFs) 355, one or more VNFs 360, one or more catalogs/repositories 365, NFV service assurance 370, and NFV infrastructure (NFVI) 375. SDN architecture 300 may be implemented by a combination of physical and virtualized devices and functions. For example, blocks 305-350 and 360-375 may be implemented as hosted processes running on server devices 210, while block(s) 355 may be implemented as one or more physical network devices (e.g., hubs, routers, base stations, access points, etc.) that are dedicated to particular functions and domains.

The quantity of physical and virtual components, illustrated in FIG. 3, is provided for explanatory purposes only. In practice, network 400 may include additional components, fewer components, different components, or differently arranged components than illustrated in FIG. 3. Alternatively, or additionally, one or more of the components of network 300 may perform one or more functions described as being performed by another component of network 300. In some implementations, one or more components of network 300 may be physically (or virtually) integrated in, and/or may be physically (or virtually) attached to, one or more other components of network 300. Also, while "direct" connections are shown in FIG. 3 between certain components, some components may communicate with each other via one or more additional components.

Portal 305 may include a web portal or another type of user interface that enables a customer or operator to access the network services (e.g., via operator device 230 and/or UE 240). In some implementations, portal 305 may include an operator device 230 that can access, configure, monitor, and/or manage SDN architecture 300. Service orchestrator 310 may include a user-facing function responsible for providing a services catalog to portal 305. Examples of items included in the service catalog may include network service provided, by SDN architecture 300, to end users, such as types of network access, levels of QoS, access to media content, etc. End-to-end orchestrator 315 may allocate, instantiate, activate, and manage network functions (e.g., VNFs 360) throughout SDN architecture 300. Examples of network functions provided by SDN architecture 300 may correspond to different types of network services provided by SDN architecture 300 (e.g., types of network access, levels of QoS, access to media content, etc.). NFV orchestrator 320 may include a subset of end-to-end orchestrator 314, responsible for managing and monitoring hosted processes of SDN 230. VNF manager 325 may be responsible for VNF lifecycle management of hosted processes (e.g., instantiating, upgrading, scaling, repairing, terminating, etc.).

Virtualization infrastructure manager (VIM) 330 and NFVI 375 may be responsible for allocating server device resources (e.g., processing capacity, memory capacity, storage capacity, etc.) to the hosted processes of SDN architecture 300. In some implementations, the physical resources managed by VIM 330 may include the physical resources of one or more server devices 210 of a data center. As described in greater detail below with respect to FIGS. 6-13, API controller 340 may receive requests for a network service, build an API chain for implementing the network service, and providing the API chain to SDN architecture 300 for implementation. SDN controller 350 may be responsible for connectivity services in a WAN operated by SDN architecture 300.

PNF 355 may include a network function implemented on a physical device (which may include software installed thereon) that is particularly dedicated to a network function (e.g., a gateway, a router, an access point, a base station, etc.). In some implementations, PNFs 355 may be controlled, managed, and monitored by SDN controllers 350. An example of a wireless telecommunications network that is implemented using a combination of PNFs 355 and VNFs 360 is discussed below with reference to FIG. 4.

Catalogs/repositories 365 may include information regarding network services, orders, transactions, etc., regarding SDN architecture 300. In some implementations, catalogs/repositories 365 may include a repository of APIs currently and/or previously implemented in SDN architecture 300. In some implementations, repository 365 of APIs may be included in API controller 340 or another node of SDN architecture 300. NFV service assurance component 370 may be responsible for collecting and monitoring data, which may include events, conditions, messages, performance levels, etc., of SDN architecture 300. As shown in FIG. 3, service assurance component 370 may receive data from one or more functions of SDN architecture 300 depending on the particular implementation.

Figure 4:
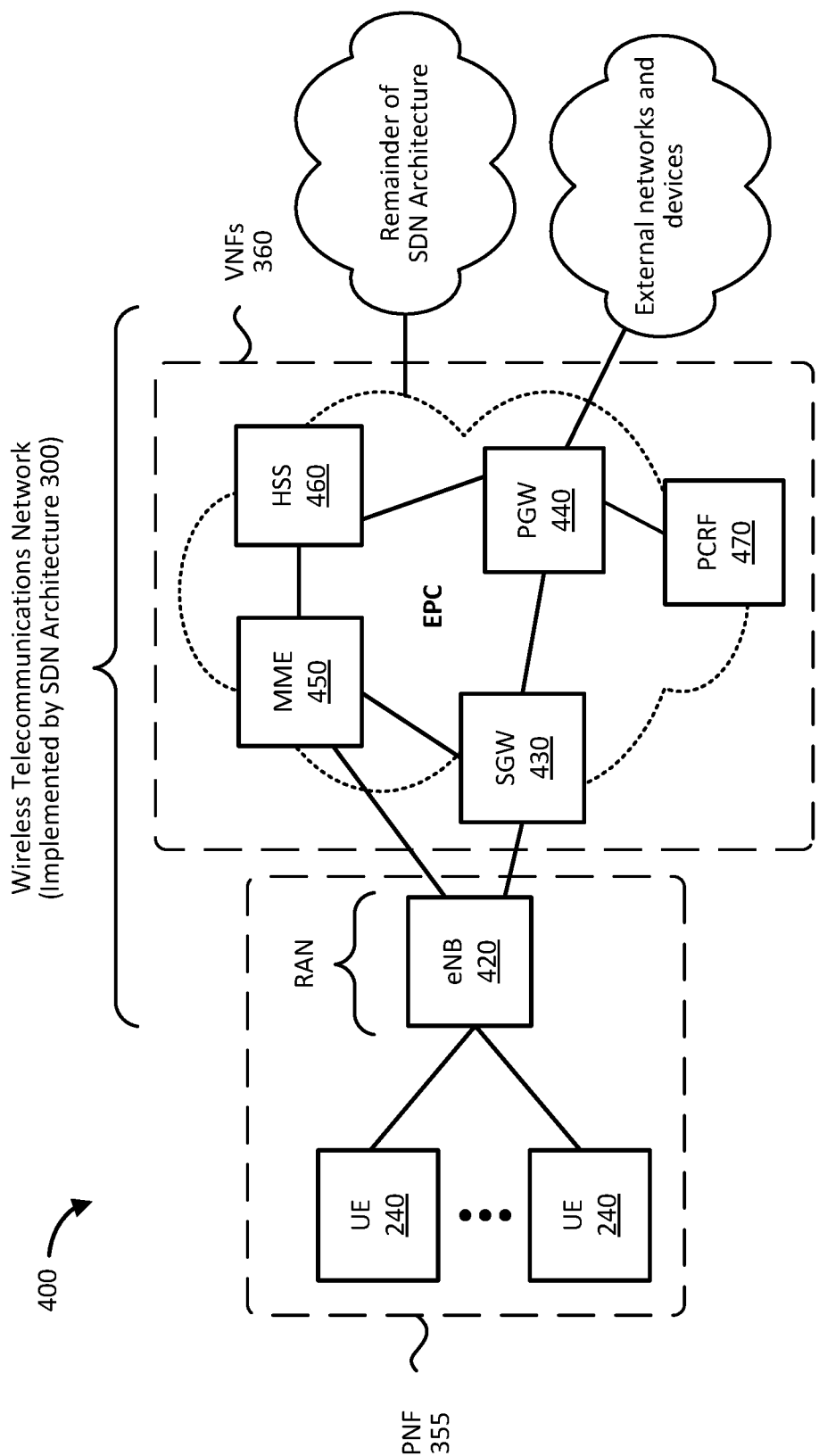
FIG. 4 illustrates an example network in which systems and/or methods described herein may be implemented.

FIG. 4 is a diagram of an example network 400 in which systems and/or methods described herein may be implemented. As shown, some of the devices depicted in FIG. 4 may be implemented as PNFs 355, while other devices may be implemented as VNFs 360. The PNFs 355 and VNFs 360 may be part of SDN architecture 300 described above with reference to FIG. 3. In some implementations, one or more of the devices depicted in FIG. 4 as a PNF may instead be implemented as a VNF, or a combination of one or more PNFs and/or one or more VNFs.

As shown in FIG. 4, example network 400 may include one or more UEs 240, a wireless telecommunications network, and one or more external networks and/or devices. The wireless telecommunications network may include an Evolved Packet System (EPS) that includes an LTE network and/or an evolved packet core (EPC) network that operates based on a Third Generation Partnership Project (3GPP) wireless communication standard. The LTE network may be, or may include, radio access networks (RANs) that include one or more base stations, some or all of which may take the form of enhanced node Bs (eNBs) 420, via which UEs 410 may communicate with the EPC network.

The EPC network may include Serving Gateway (SGW) 430, PDN Gateway (PGW) 440, Mobility Management Entity (MME) 450, Home Subscriber Server (HSS) 460, and/or Policy and Charging Rules Function (PCRF) 470. As shown, some of the devices depicted in FIG. 4 may be implemented as VNFs hosted by one or more server devices 210. The EPC network may enable UEs 410 to communicate with an external network, such as a PLMN, a PSTN, and/or an IP network (e.g., the Internet).

UE 210 is described above with reference to FIG. 2. eNB 420 may include one or more network devices that receives, processes, and/or transmits traffic destined for and/or received from user device 410 (e.g., via an air interface). eNB 420 may be connected to a network device, such as site router, that functions as an intermediary for information communicated between eNB 420 and the EPC. In some implementations, eNB 420 may be disaggregated and virtualized in one or more ways, such as by a combination of a remote radio head (RRH) and a virtual baseband unit (vBBU).

SGW 430 may aggregate traffic received from one or more eNBs 420 and may send the aggregated traffic to an external network or device via PGW 440. Additionally, SGW 430 may aggregate traffic received from one or more PGWs 460 and may send the aggregated traffic to one or more eNBs 430. SGW 430 may operate as an anchor for the user plane during inter-eNB handovers and as an anchor for mobility between different telecommunication networks. PGW 440 may include one or more network devices that may aggregate traffic received from one or more SGWs 430, and may send the aggregated traffic to an external network. PGW 440 may also, or alternatively, receive traffic from the external network and may send the traffic toward user device 410 (via SGW 430 and/or eNB 420).

MME 450 may include one or more computation and communication devices that act as a control node for eNB 420 and/or other devices that provide the air interface for the wireless telecommunications network. For example, MME 450 may perform operations to register user device 410 with the wireless telecommunications network, to establish bearer channels (e.g., traffic flows) associated with a session with user device 410, to hand off user device 410 to a different eNB, MME, or another network, and/or to perform other operations. MME 450 may perform policing operations on traffic destined for and/or received from user device 410.

HSS 460 may include one or more devices that may manage, update, and/or store, in a memory associated with HSS 460, profile information associated with a subscriber (e.g., a subscriber associated with user device 410). The profile information may identify applications and/or services that are permitted for and/or accessible by the subscriber; a Mobile Directory Number (MDN) associated with the subscriber; bandwidth or data rate thresholds associated with the applications and/or services; and/or other information. The subscriber may be associated with user device 410. Additionally, or alternatively, HSS 460 may perform authentication, authorization, and/or accounting operations associated with the subscriber and/or a communication session with user device 410.

PCRF 470 may receive information regarding policies and/or subscriptions from one or more sources, such as subscriber databases and/or from one or more users. PCRF 470 may provide these policies to PGW 440 or another device so that the policies can be enforced. As depicted, in some implementations, PCRF 470 may communicate with PGW 440 to ensure that charging policies are properly applied to locally routed sessions within the telecommunications network. For instance, after a locally routed session is terminated, PGW 440 may collect charging information regarding the session and provide the charging information to PCRF 470 for enforcement. The EPC may be in communication with a remainder of the SDN architecture, which may include one or more of the nodes discussed above regarding FIG. 3. The external networks and devices may, for example, be network external devices 250 and/or network 260 described above regarding FIG. 2.

Figure 5:
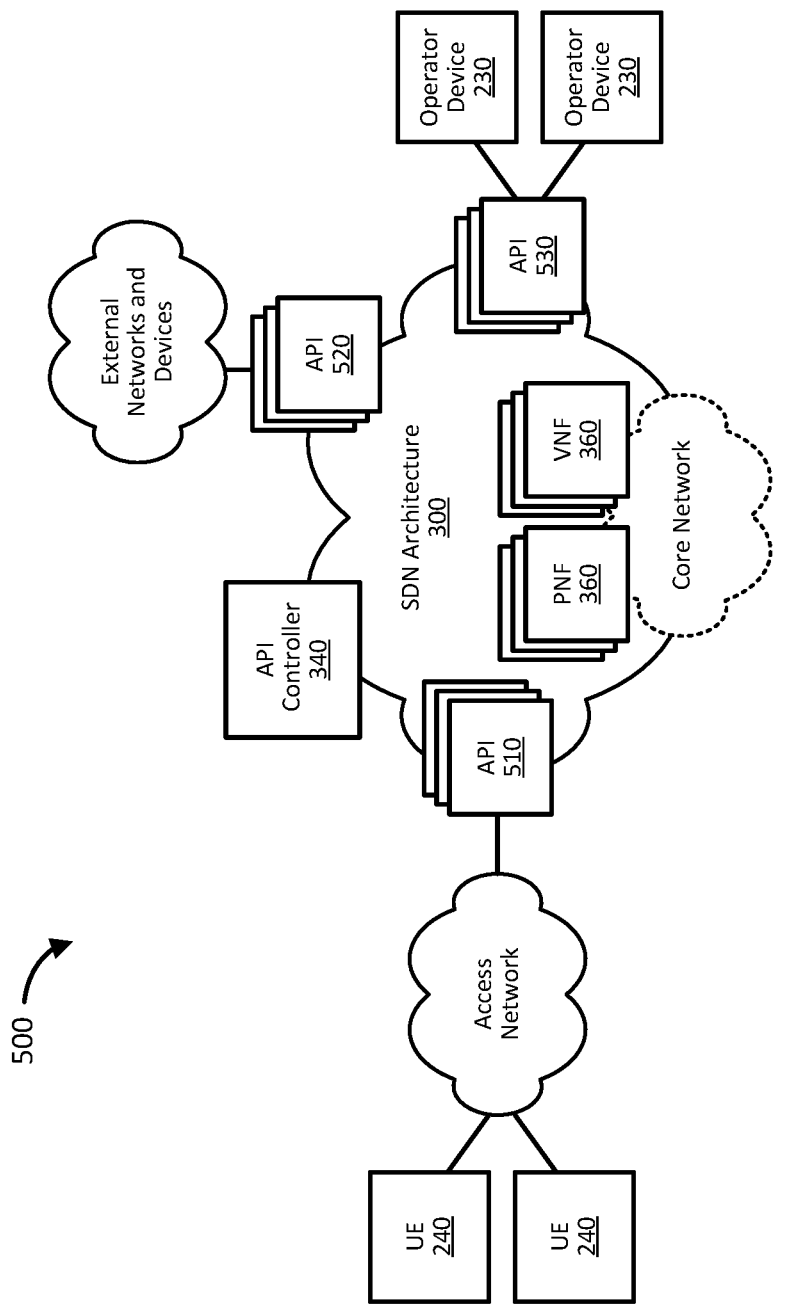
FIG. 5 illustrates an example application program interfaces (APIs) within a SDN.

FIG. 5 is a diagram of example APIs 510-530 in SDN 500. The example represented by FIG. 5 may illustrate the ubiquitous and integral role of APIs in providing a network service in a SDN environment. As shown, SDN 500 may include SDN architecture 300 in communication with an access network (e.g., eNB 420), external networks and devices, and operator devices 230. As explained above with reference to FIGS. 3 and 4, SDN architecture 300 may include PNFs 355 and/or VNFs 360, which may be configured to provide certain network services (such as core network services for UEs 240 via the access network). As shown, the communications between the networks and devices of FIG. 5 are enabled by APIs 510-530, the type and particular configuration of which may vary from one implementation to another. Additionally, APIs may be used at various network levels within SDN 500, such as product and service ordering, billing, subscriber account management, authentication and authorization services, QoS management, application management, etc. As such, when an individual (e.g., an operator of operator device 230, user of UE 240, etc.) requests a particular network service, API controller may respond, as described herein, to determine the chain of APIs that will enable the network service to be provided.

Figure 6:
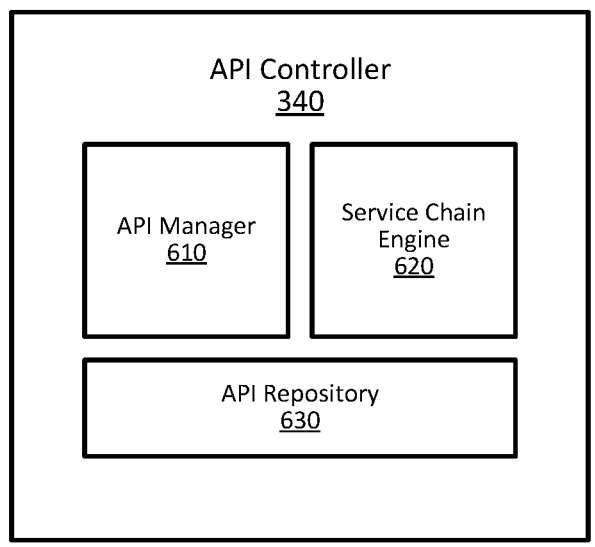
FIG. 6 illustrates an example API controller.

FIG. 6 is a diagram of an example API controller 340. As shown, API controller 340 may include API manager 510, service chain engine 520, and API repository 530. The quantity of physical and virtual components, illustrated in FIG. 6, is provided for explanatory purposes only. In practice, network 400 may include additional components, fewer components, different components, or differently arranged components than illustrated in FIG. 6. Additionally, the components of API controller 340 may be implemented by computer hardware, software, or a combination thereof. For example, while API repository is shown in FIG. 6 as being internal to API controller 340, in some implementations, API repository 630 may correspond to one or more external devices.

API manager 610 may analyze requests for network services and identify APIs that would be appropriate for the requested service. An "API chain" (as described herein) may include a sequence of APIs that coincides with the sequence of network functions (e.g., network nodes communicating with one another, accessing relevant features of a hosted process, etc.) used to provide a network service. While "API chain" may include a sequence of logical APIs, in some implementations, one or more of the APIs of the API chain may be implemented in parallel. Detailed examples, regarding how APIs are identified, are described below regarding FIGS. 7-11. Service chain engine 620 may determine whether an appropriate API or API chain already exists for a recently received request for network services. For instance, when an API or an API chain is implemented in a SDN architecture, API manager 610 may cause API repository 630 to store a record of the API chain that was used to implement the network service. The record of the API chain may include an indication (e.g., an identifier) of the service for which the API chain was created. As such, if another request for the same service is again received, service chain engine 620 may identify an appropriate API chain, stored in API repository 630, for the request.

When a request for a network service does not match any of the API records, API chain engine 620 may determine and create a chain of APIs that are suitable for providing the requested network service. Detailed examples about how API chain engine 620 may determine an API chain for a network service are discussed below regarding FIGS. 7-10. When API chain engine 620 creates a new API chain, API chain engine 620 may store a record of the API chain (along with the initial request for the network service) in API repository 630.

Figure 7:
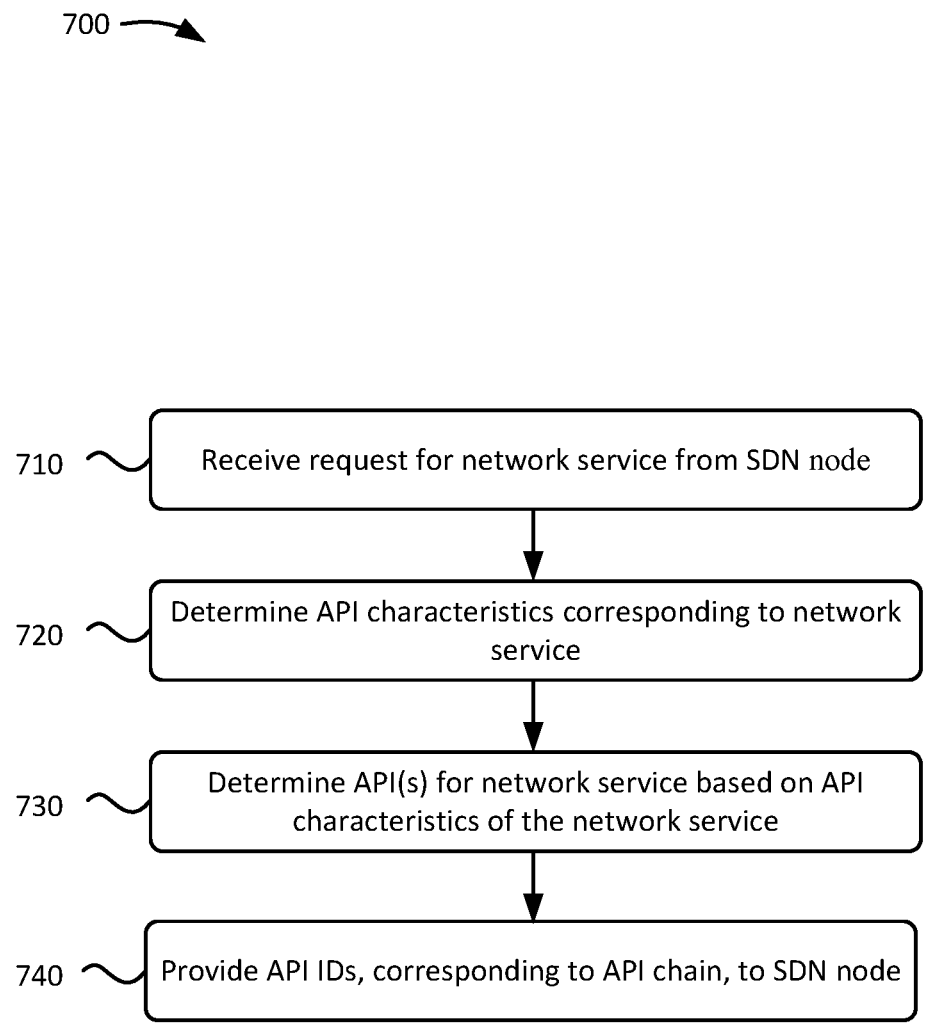
FIG. 7 illustrates an example process for providing APIs in a SDN.

FIG. 7 is a diagram of an example process 700 for providing APIs in a SDN. In some implementations, process 700 may be implemented by API controller 340. FIG. 7 is described below regarding FIGS. 8A-10. As shown in FIG. 7, process 700 may include receiving, from a SDN node, a request for a network service (block 710). For example, API controller 310 may receive, from OSS/BSS 335, a request for a network service. Examples of a network service may include network access services, authentication and authorization services, quality of service (QoS) services, account management services, usage monitoring services, billing services, load balancing services, data storage services, etc. The request may include a network service ID and characteristics regarding the network service (e.g., QoS requirements, SLA requirements, an entity to which the network service corresponds, etc.).

Figure 8A:
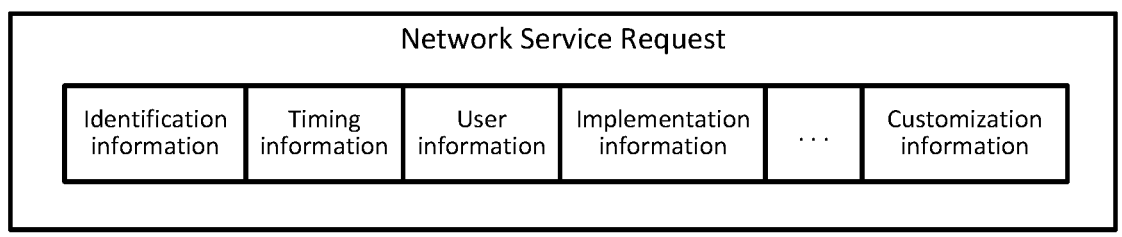
FIG. 8A is a diagram of an example of network service request.

FIG. 8A is a diagram of an example of network service request 805. As shown, the request may include identification information, a timing information, user information, implementation information, customization information, etc.

Identification information may include information about the network service being request and/or the particular request for the network service. Examples of such information may include a product catalog ID, an order ID corresponding to the network service, a network service ID associated with the network service, a service type associated with a network service, etc. The timing information may include a timestamp indicating when the network service was requested, when the request was received, when the network service is scheduled or requested to be implemented, a duration of time for which the network service is scheduled or requested to be implemented, etc.

User information may indicate information relating to an individual or entity that initiated the request and/or the individual/entity for whom the network service is intended. Examples of such information may include a name, an address, a customer ID, user credentials (e.g., for authentication and/or authorization purposes), a user account ID, an International Mobile Subscriber Identity (IMSI) of a user device, International Mobile Station Equipment Identity (IMEI), IP address, MAC address, and/or some other physical or logical identifier. Implementation information may include parameters and other types of information about how the network service is to be implemented. Examples of such information may include QoS requirements, SLA requirements, resource utilization guidelines or requirements, etc. Customization information may include information about how the network service is to be customized (e.g., how the network service is to be configured, deployed, etc.).

Figure 8B:
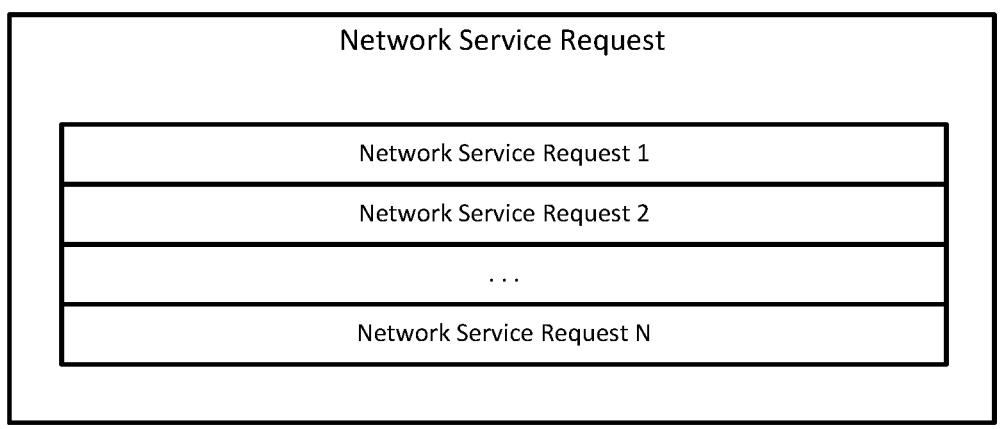
FIG. 8B is a diagram of another example of network service request.

FIG. 8B is a diagram of another example of network service request 810. As shown, network service request 810 may include multiple network service requests (e.g., multiple instances of network service request 805). For example, a request from a customer to view media content may include requests for multiple services, such as 1) an authentication and authorization service whereby the user may gain access to the media content; 2) a service whereby the user pays for, and/or is charged for, the media content; 3) a service to provision network nodes (e.g., PNFs 355 and/or VNFs 360) for routing the media content to a user device of the user, etc. As such, some network service requests may include implementation of a chain or set of actions (referred to herein as a "service chain") that may result in providing a network service to a customer. In some implementations, the network service request may also, or alternatively, be to modify an existing network service, manage or monitor a network service, inform a user about a network service (including billing), authorize a network service, ensure a network service is secure, etc.

Referring again to FIG. 7, process 700 may include determining API characteristics corresponding to the network service (block 720). For example, API controller 340 may analyze information included in the request for the network service and, based on the information, determine the API characteristics that correspond to the network service. API characteristics, as described herein, may include capabilities and other attributes describing the type of API that would be appropriate for the network service that has been requested. In some implementations, API controller 340 may determine a characteristic code based on the API characteristics of a particular network service. Additionally, API controller 340 may use the characteristic code to identify one or more APIs that fit the combination of API characteristics corresponding to the network service. In some implementations, prior to analyzing the information in the network service request, API controller 340 may decompose, convert, or otherwise process the information in the request into a standardized format that API controller 340 may use to analyze network service requests. The standardized format may correspond to the format in which APIs are referenced, stored, and managed in SDN architecture 300. In some implementations, the API request (e.g., a name, an ID, or another type of information in the request) may correspond to a chain of network interactions, communications, events, etc., that are to occur in order to provide the network service. The chain of network interactions, communications, events, etc., may be stored in libraries/repositories of the SDN. APIs may be derived based on the characteristics of each of the interactions, communications, events, etc., thereby forming a chain of APIs for the network service.

Figure 9:
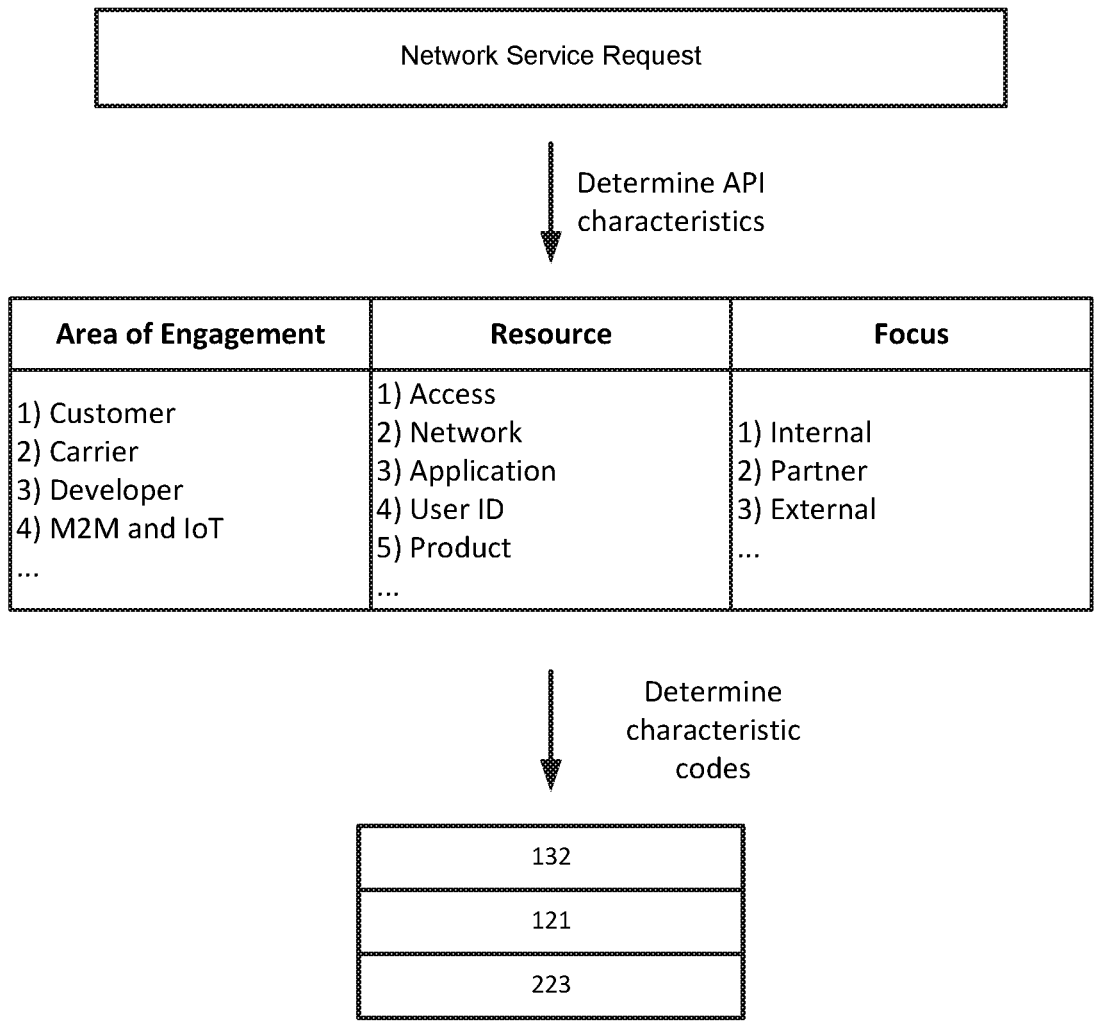
FIG. 9 illustrates an example implementation for determining API characteristics corresponding to a network service.

FIG. 9 is a diagram of an example implementation for determining API characteristics corresponding to the network service. The implementation of FIG. 9 may be performed by API controller 340. For instance, API controller 340 may determine the API characteristics for a network service based on the request for the network service. In some implementations, an API characteristic may include an attribute (e.g., Customer, Carrier, Access, Network, Internal, etc.) associated with a particular category (e.g., Area of Engagement, Resource, and Focus).

"Area of Engagement" may refer to the entity for whom the network service is being provided (e.g., a customer, a carrier, a developer, etc.). "Resource" may include a primary service domain to which the network service corresponds (e.g., network access, media content, application support, etc.). "Focus" may indicate how the network service is to be provided (e.g., whether the network service is provided internally (within the network itself) or externally (by an external provider). Additionally, API controller 340 may implement a characteristics scheme implemented by SDN architecture 300. For instance, in the example of FIG. 9, the characteristics scheme may include a scenario where each network service includes one attribute from each category.

In some implementations, the API characteristics may be explicitly included in the request. In some implementations, API controller 340 may determine the API characteristics by interpreting information in the request, which may include applying a rule, a policy, etc., for determining API characteristics. For example, API controller 340 may include a data structure that API controller 340 may use to map information in the request (e.g., network service ID, user ID, etc.) to particular API characteristics.

API controller 340 may determine a characteristic code for the network service based on the API characteristics of the network service. For example, each API characteristic may be associated with a unique ID (e.g., 1, 2, 3, etc.) that may be combined to create a characteristic code that represents the combination of API characteristics for that network service. In the example of FIG. 9, the characteristic code includes a three-digit code, where the first digit corresponds to a unique ID of the Area of Engagement category, the second digit corresponds to a unique ID of the Resource category, and the third digit corresponds to the Focus category. For instance, the characteristic code "132" is a combination of unique IDs for "Customer," "Application," and "Partner;" the characteristic code "121" is a combination of unique IDs for "Customer," "Network," and "Internal;" and the characteristic code "233" is a combination of unique IDs for "Carrier," "Application," and "External."

The quantity and types of characteristics and categories depicted in FIG. 9 are provided for explanatory purposes only. In practice, characteristics and categories may include additional characteristics and categories; less characteristics and categories; different characteristics and categories; or differently arranged characteristics and categories than illustrated in FIG. 9.

Returning to FIG. 7, process 700 may include determining APIs for the network service based on the API characteristics of the network service (block 730). For example, API controller 340 may access an API repository that includes the APIs of SDN architecture 300 and API characteristics corresponding to each API. Additionally, API controller 340 may match the API characteristics corresponding to the requested network service to the API characteristics of the APIs in the API repository. In some implementations, instead of including copies of actual APIs, the API repository may instead include an API ID of each API of SDN architecture 300, and each API ID may be associated with an API characteristic code representing the API characteristics of the corresponding API.

In some implementations, API controller 340 may determine the APIs for providing a network service based on information included in the request itself. For instance, API controller 340 may receive a request to view a video, and the request may include information identifying the video itself, information about the streaming service from which the video is to be accessed, the name of the video, the length of the video, etc. In some implementations, the request may also indicate certain network conditions relating to the service, such as the quality of the video that is to be accessed, the bandwidth with which the video is to be provided, etc. In some implementations, API controller 340 may determine that such information is helpful in providing the request network service, and may identify (and/or implement) APIs useful for determining such information. In some implementations, API controller 340 may determine APIs that not only enable the SDN to provide the service but that also enable external networks and devices to communicate with the SDN to provide the requested service.

Figure 10:
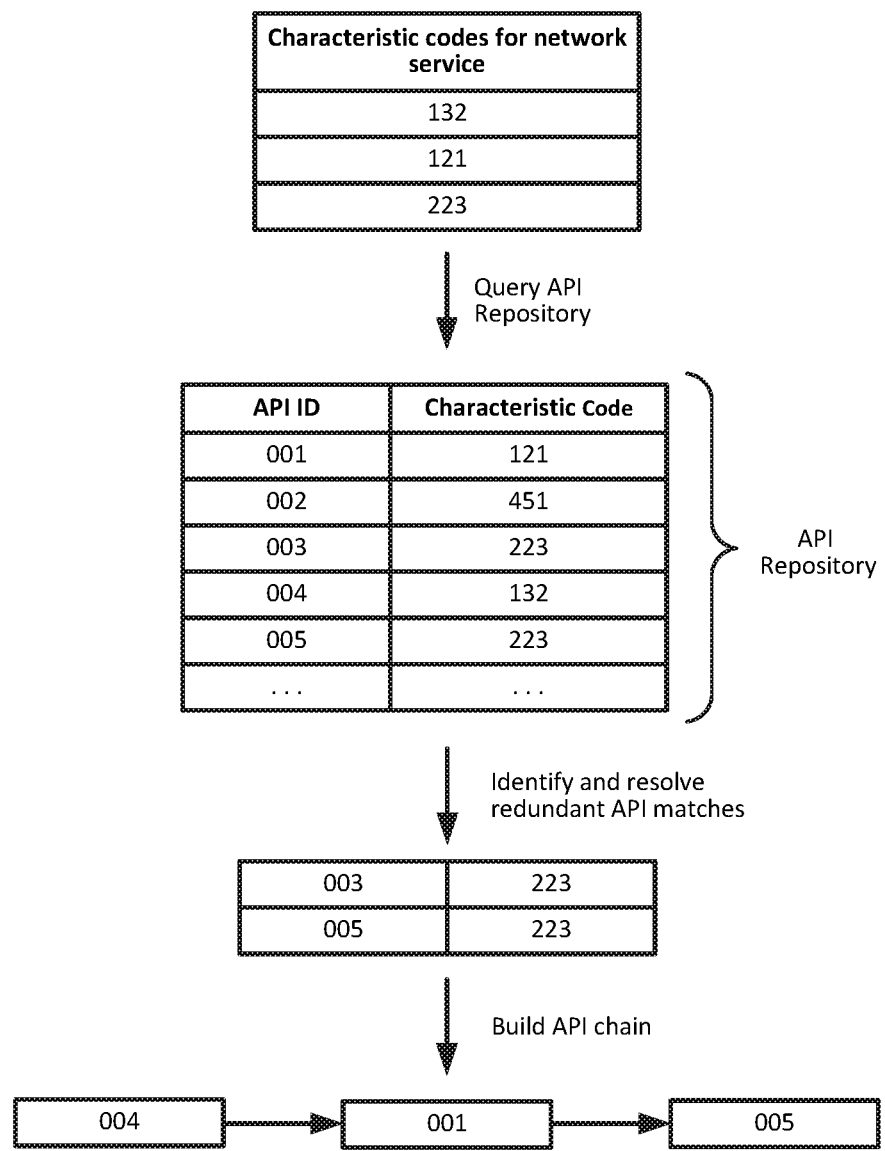
FIG. 10 illustrates an example implementation for determining APIs for a network service based on API characteristics of a network service.

FIG. 10 is a diagram of an example implementation for determining APIs for a network service (e.g., a requested network service) based on the API characteristics of the network service. The implementation of FIG. 10 may be performed by, for example, API controller 340. For instance, API controller 340 may use characteristic codes to query an API repository for APIs that fit the API characteristics of the network service of the request. As shown, the API repository may include API IDs (e.g., 001, 002, etc.) and characteristic codes (e.g., 121, 451, etc.) associated with each API of SDN architecture 300.

In the example of FIG. 10, a network service being requested may correspond to characteristic codes 132, 121, and 233. In some implementations, the network service may actually include three different network services (e.g., one for each characteristic code). Based on the characteristic codes 132 and 121, API controller 340 may determine that the APIs corresponding to API ID 004 and 001 are appropriate for the network service. Additionally, API controller 340 may determine that characteristic code 233 is associated with multiple API IDs (e.g., API IDs 003 and 005). Such a scenario may indicate that there may be more than one API that would be suitable for the network service corresponding to characteristic code 233.

API controller 340 may analyze the prospect of using each API (e.g., 003 and 005) to determine which API may be more appropriate for the network service. In some implementations, API controller 340 may analyze the APIs by processing the network service request further (e.g., by investigating the feasibility and implications of providing the network service using the APIs). For instance, API controller 340 may determine whether the APIs are both available for SDN based ordering and implementation, which API would consume fewer resources, whether there are enough network resources (e.g., processing capacity, memory capacity, network bandwidth, etc.) to implement the network service using the APIs, whether one API corresponds to an entity (e.g., a partner entity) that is preferred over the entity of another API (e.g., an external entity), etc. In some implementations, API controller 340 may communicate with other devices and networks to evaluate an API. For instance, API controller 340 may access information on resource availability, congestion, etc., corresponding to internal (e.g., nodes within SDN architecture 300) and/or external networks and devices (e.g., a media content server or network).

Once redundant API matches are resolved, API controller 340 may determine the API IDs for the network service. In some implementations, API controller 340 may do so by building an API chain. An API chain, as described herein, may indicate the APIs to be used to perform the actions (referred to herein as a "service chain") to provide the network service that has been requested. The APIs may be arranged in an order that is consistent with the actions in the corresponding service chain. As shown in FIG. 10, API controller 340 the API chain may include API IDs 004, 001, and 005.

Referring again to FIG. 7, process 700 may include providing the APIs to the SDN node (block 740). For example, API controller 340 may communicate the APIs, for responding to a network service request, to OSS/BSS 335. In some implementations, API controller 340 may communicate the APIs as an API chain, an example of which is discussed above with reference to FIG. 10.

Figure 11:
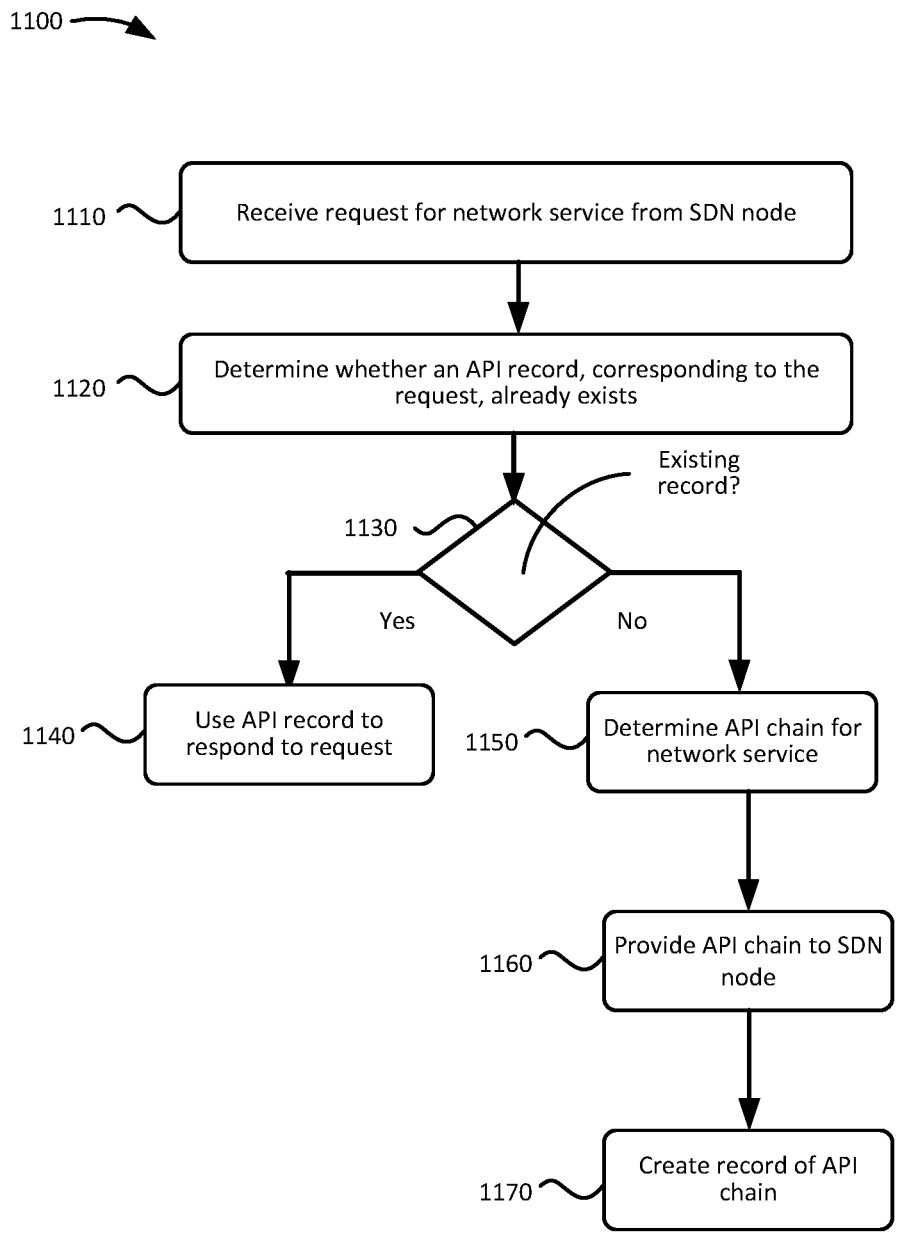
FIG. 11 illustrates an example process for providing APIs in a SDN environment.

FIG. 11 is a diagram of an example process 1100 for providing APIs in a SDN environment. In some implementations, process 1100 may be implemented by API controller 340.

As shown, process 1100 may include receiving a request for a network service from a SDN node (block 1110). For example, API controller 340 may receive, from OSS/BSS 335, a request for a network service. The request may include a network service ID, corresponding to the requested network service, and characteristics regarding the network service (e.g., the QoS, SLA requirements, an entity to which the network service corresponds, etc.).

Process 1120 may include determining whether an API record, corresponding to the request, already exists (block 1110). For instance, API controller 340 may compare the request to API records stored in an API repository. Each API record may include information describing a request for a network service (e.g., may include network service IDs for requests that were previously handled) and an API (or API chain) that was used to provide the network service requested.

When an API record, corresponding to the request, already exists (block 1130—Yes), process 1100 may include using the API record to respond to the request for the network service (block 1140). For example, when an API record matches a current API request, API controller 340 may use the record to promptly identify the API chain that should be used to provide the request. Additionally, API controller 340 may respond to the request for the network service by providing the API chain to the SDN node that sent the request.

When an API record, corresponding to the request, does not exist (block 1130—No), process 1100 may include determining an API chain for the network service (block 1150). For example, if API controller 340 determines that an API record, corresponding to the request, does not already exist, API controller 340 may generate an API for implementing the network service. For instance, as described above with reference to FIGS. 7, 9, and 10, API controller 340 may determine API characteristics corresponding to the network service and determine APIs for the network service based on the API characteristics.

In some implementations, a request for services may be incomplete by lacking information (e.g., a service name, a network service ID, a service type, etc.) for matching the request to a record of an API or chain of APIs. In such a scenario, API controller 340 may still attempt to match the request to existing API records. If the request matches to a unique API record, API controller 340 may use the unique API record to respond to the request (block 1140). If the request matches multiple unique API records, such that it is ambiguous which API record should actually correspond to the request, API controller 340 may return an error notice or the multiple alternative records as possibilities. In such a scenario, the SDN may prompt the customer submitting the request to provide the lacking information, and the SDN may provide the updated request to the SDN controller or match the updated with the multiple alternative records that were provide previously. If the initial request does not match any records, API controller 340 may determine an API chain or the network service (bock 1150).

Process 1100 may include providing the API (or the API chain) to the SDN node (block 1160). For instance, API controller 340 may communicate the API chain to the SDN node (e.g., OSS/BSS 335) that communicated the request. As described above with reference to FIG. 10, the API chain may include a sequence of API IDs.

Process 1100 may include creating a record of the API provided to the SDN node (block 1170). For example, API controller 340 may create a data structure that describes the request for the network service along with the API chain used to provide the network service. As such, if/when API controller 340 receives a request for the same network service, API controller 340 may promptly respond to the request based on the API record, instead of having to re-determine the API chain for the request.

Figure 12:
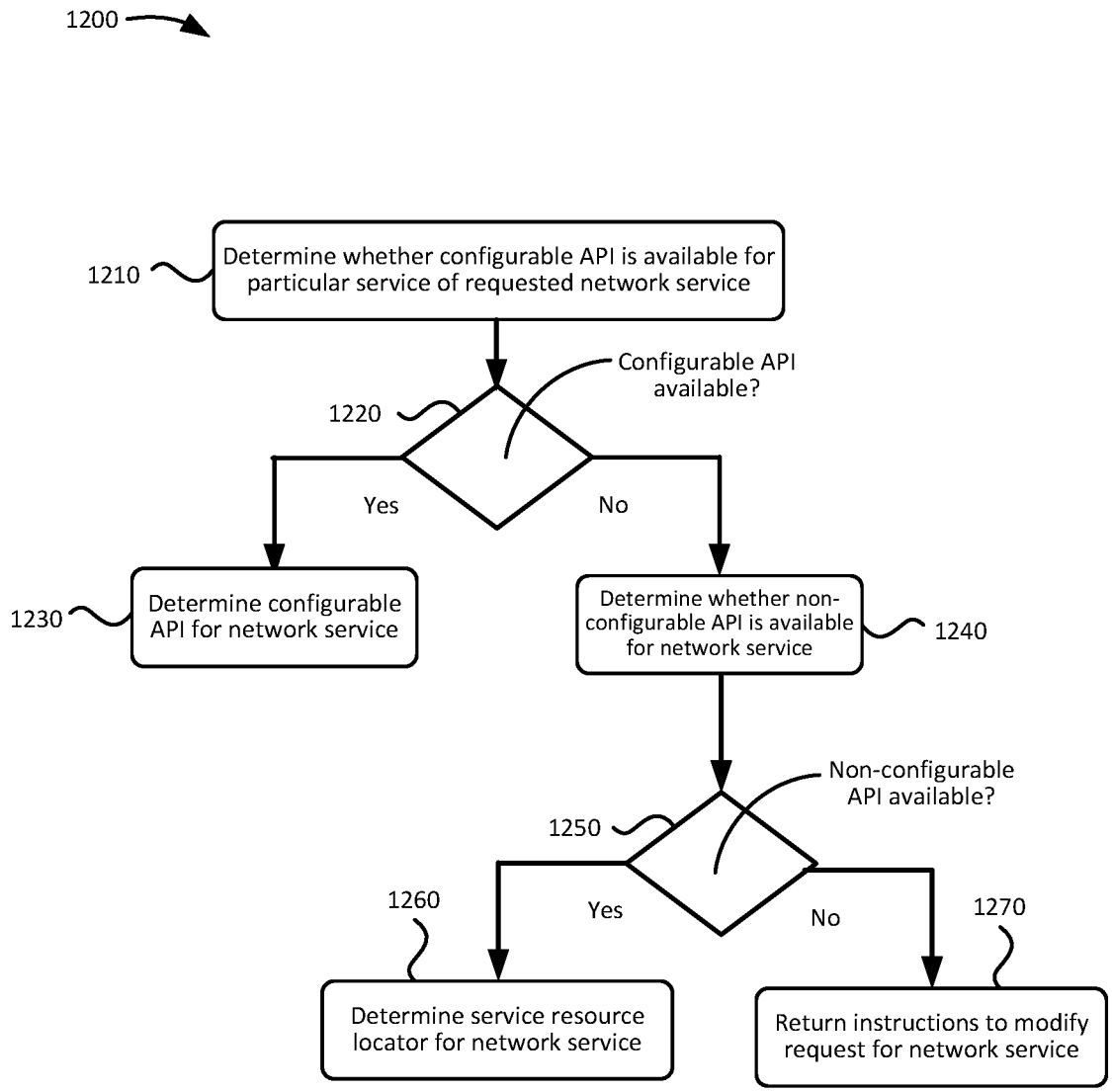
FIG. 12 illustrates an example process for determining an API for a network service.

FIG. 12 is a diagram of an example process 1200 for determining an API for a network service. In some implementations, process 1200 may be implemented by API controller 340. Process 1200 may include an example determining a single API for a given network service. As such, if providing the network service involves a chain of APIs, API controller 340 may perform multiple iterations of process 1200 in order to determine all of the APIs for the API chain.

Process 1200 may include determining whether a configurable API is available for the network service (block 1210). For example, to identify an API in an API chain, API controller 340 may first determine whether there is a configurable API that corresponds to the network service. A configurable API, as described herein, may include an API that may be customized according to one implementation or another. For instance, the parameters and/or preferences of a configurable API may be specified in one way for a particular scenario and another way for a different scenario. In some implementations, a configurable API may include an API that may be customized per a particular implementation and within a particular administrative domain (e.g., the administrative domain of the organization providing the network service). A configurable API may include an API with one or more settings or other types of characteristics that may be specified by the SDN architecture 300 based on, for example, the network service that's request, internal network communications, etc. For example, a configurable API may include a first group of settings when implemented to enable multimedia (e.g., video) communications and a second group of settings when implemented to enable a telephone call.

When a configurable API is available (block 1220—Yes), process 1200 may include determining the configurable API for the network service (block 1230). For example, if API controller 340 determines that a configurable API is available, API controller 340 may determine the API as described herein. In some implementations, API controller 340 may have determine that the available API is a configurable API, concurrently with determining the API for the network service. For instance, as described above regarding FIGS. 7, 9, and 10, API controller 340 may determine API characteristics corresponding to the network service and determine APIs for the network service based on the API characteristics.

When a configurable API is not available (block 1220—No), process 1200 may include determining whether a non-configurable API is available for the network service (block 1240). A non-configurable API, as described herein, may include a particular API that is tied to a specific network node, a particular cloud application, etc. A non-configurable API may not have parameters or another type of customizable feature that may be configured and re-configured according to a particular scenario or implementation. Additionally, or alternatively, a non-configurable API may include an API that is not within a particular administrative domain (e.g., the administrative domain of the organization providing the network service). Additionally, or alternatively, a non-configurable API may include an API (and/or configuration thereof) that must be used for a particular network service.

When a non-configurable API is available (block 1250—Yes), process 1200 may include providing a service resource locator for the network service (block 1260). For instance, when a particular network service is accessed by a unique, non-configurable API, API controller 340 may return a service resource locator that corresponds to the network service (since the network service may already be associated with the non-configurable API). A service resource locator may include a location (e.g., within a library/repository) within SDN architecture 300 where a copy of the unique, non-configurable API may be located. In some implementations, SDN architecture 300 may be capable of identifying and using the non-configurable API based on the service resource locator.

When a non-configurable API is not available (block 1250—No), process 1200 may include returning instructions to modify the request for the network service (block 1270). For instance, API controller 340 may determine that a requested network service does not match any APIs in API repository 530. For example, as described above with reference to FIGS. 9 and 10, API controller 340 may determine a characteristic code for a requested network service and search API repository 530 for an API that corresponds to the characteristic code. However, in some implementations, the characteristic code may not match with any APIs in API repository 630. In such a scenario, API controller 340 may respond to the SDN node with instructions to correct the request for the network service. In some implementations, SDN node may respond to the instructions by sending an updated request for network services. The updated request may include a different network service (or combination of network services) that may correspond to APIs that are known by API controller 430.

Figure 13:
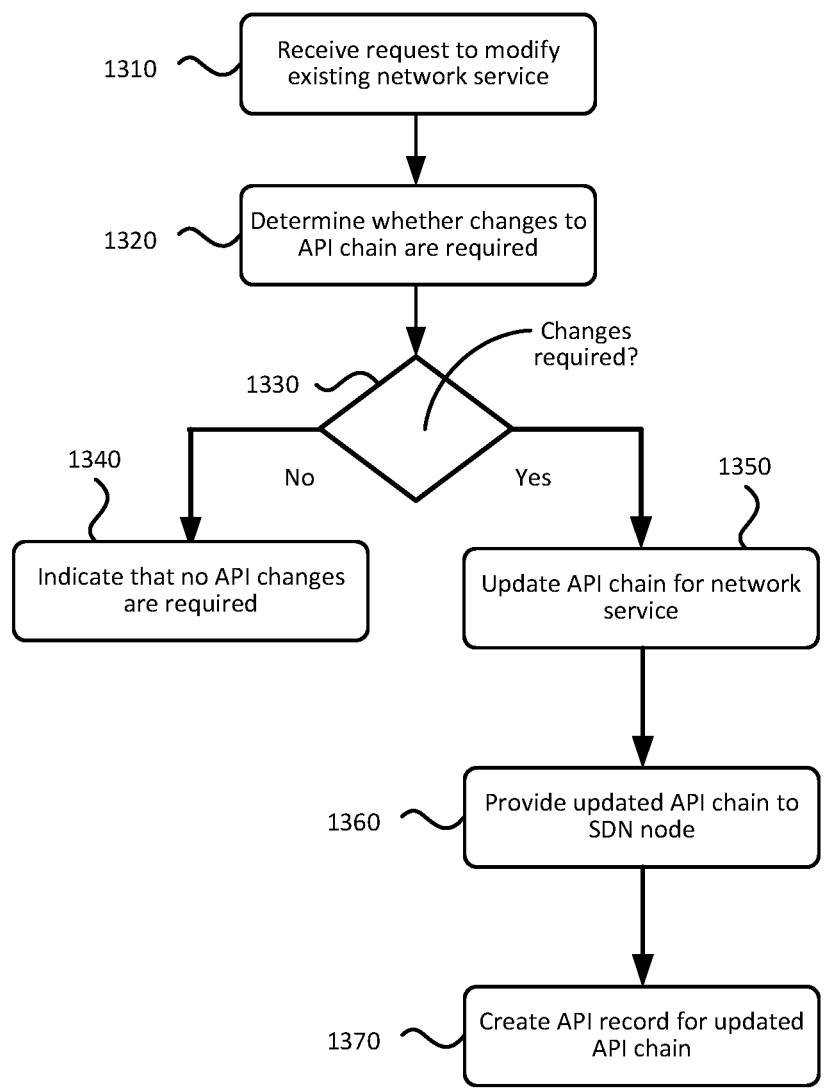
FIG. 13 illustrates an example process for changing APIs used to provide a network service.

FIG. 13 is a diagram of an example process 1300 for changing APIs used to provide a network service. In some implementations, process 1300 may be implemented by API controller 340.

Process 1300 may include receiving a request to modify an existing network service (block 1310). For example, API controller 340 may receive a request from a SDN node (such as OSS OSS/BSS 335) to change an existing network service.

Process 1300 may include determining whether changes to an API chain are required (block 1320). For instance, in response to the request to modify the network service, API controller 340 may analyze the request to determine whether changes to the API chain of the existing network service will be modified. In some implementations, API controller 340 may determine this by, for example, comparing the request for the existing network service with the request to modify the network service. In some implementations, API controller 340 may determine whether the API chain should be updated by determining a new API chain for the request to modify the network services and comparing the new API chain with the API chain associated with the existing network services. In some implementations, API controller 340 may determine the new API chain in a manner similar to that described above with reference to FIGS. 7-10.

When changes to the API chain are not required (block 1330—No), process 1300 may include indicating that no API changes are required for the network service (block 1340). For example, when changes to the API chain are not required, API controller 340 may respond to the request (e.g., OSS/BSS 335) by indicating that the API chain for the existing network service is applicable to the network services being modified.

When changes to the API chain are required (block 1330—Yes), process 1300 may include updating the API chain for the network service (block 1350). For example, API controller 340 may modify the API chain in accordance with the modification to the network services. The manner in which the API chain is updated may depend on the original API chain and the modifications to the network services. In some implementations, the original API chain may undergo isolated changes (e.g., the addition, replacement, or removal of a single API or service resource locator). In some implementations, the original API chain may undergo complex changes, where multiple APIs (and/or or service resource locators) in the original API chain are added, replaced, or removed (e.g., the introduction of one new API may require other APIs to be changed and/or new service resource locators to be provided in the API chain).

Process 1300 may include providing the updated API chain to the SDN node (block 1360). For example, API controller 340 may respond to the request to modify network services, by communicating an updated API chain for the new network services. As discussed above with reference to FIG. 10, the updated API chain may include a sequence of API IDs that represent the APIs (and/or or service resource locators) that are to be used to implement the modified network service.

Process 1300 may include creating an API record for the updated API chain (block 1370). For example, API controller 340 may create a data structure that describes the request to modify the network service along with the updated API chain. In some implementations, API controller 340 may create the API record by updating an existing API record corresponding to the original network service and API chain. In some implementations, API controller 340 may create a new API record that includes the request for the modified network service and the updated API chain for the modified network service. As such, API controller 340 may include one API record for the original network service and original API chain and another API record for the modified network service and the updated API chain.

Figure 14:
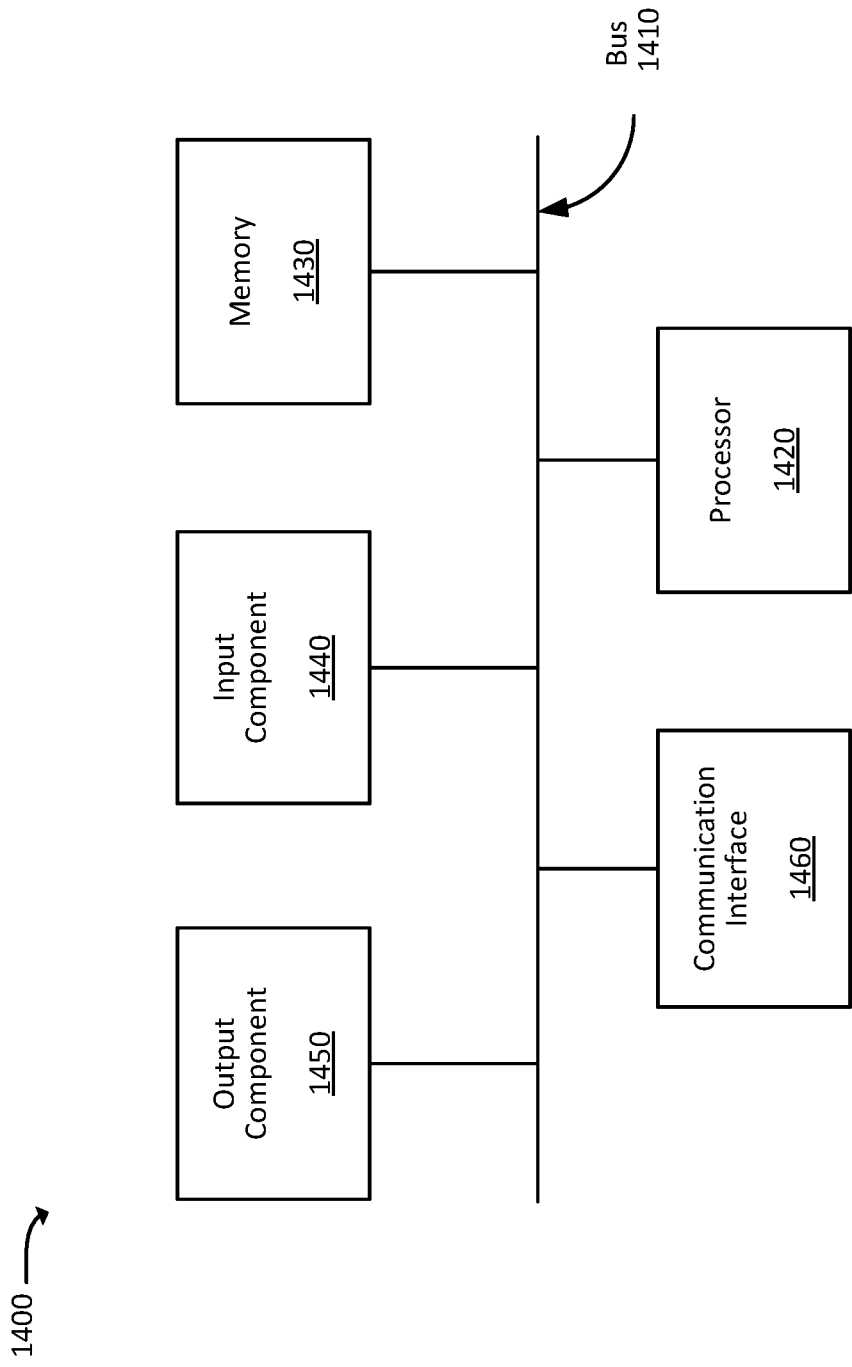
FIG. 14 is a block diagram of example components of a device.

FIG. 14 is a diagram of example components of a device 1400. Each of the devices illustrated in FIGS. 1-6 may include one or more devices 1400. Device 1400 may include bus 1410, processor 1420, memory 1430, input component 1440, output component 1450, and communication interface 1460. In another implementation, device 1400 may include additional, fewer, different, or differently arranged components. As described herein, a component may be implemented by circuitry, which may include hardware circuitry, software logic, and/or some combination thereof.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes (LEDs), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared (IR) receiver, a cellular radio, a Bluetooth radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope set forth in the claims that follow. The specification and drawings are accordingly to be regarded in an illustrative rather than restrictive sense.

For example, while a series of lines, arrows, and/or blocks have been described with regard to FIGS. 1, 3-5, 7, and 9-12, the order of the blocks and arrangement of the lines and/or arrows may be modified in other implementations. Further, non-dependent blocks may be performed in parallel. Similarly, while series of communications have been described with regard to several of the Figures provided herein, the order or nature of the communications may potentially be modified in other implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operations and behaviors of the aspects that were described without reference to the specific software code—it being understood that software and control hardware could be designed to implement the aspects based on the description herein.

Further, certain portions may be implemented as "logic" that performs one or more functions. This logic may include hardware, such as an application-specific integrated circuit (ASIC) or a field-programmable gate array (FPGA), or a combination of hardware and software.

To the extent the aforementioned embodiments collect, store or employ personal information provided by individuals, it should be understood that such information shall be used in accordance with all applicable laws concerning protection" of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
a non-transitory computer-readable memory device storing processor-executable instructions; and
one or more processors configured to execute the processor-executable instructions, wherein execution of the processor-executable instructions, by the one or more processors, causes the one or more processors to:
receive, by an application program interface (API) controller of a software defined network (SDN) node that is hosted in a cloud computing environment, a request for a network service of a wireless telecommunications network that is implemented at least in part by a SDN architecture that includes the SDN node;
determine, based on the request, a plurality of attributes associated with the requested network service;
identify, for each attribute, of the plurality of attributes, an identifier associated with the each attribute;
generate a characteristic code, that indicates the plurality of identified attributes that correspond to the requested network service, the generating including concatenating the identifiers associated with each attribute to generate the characteristic code;
determine one or more APIs for implementing the network service by:
comparing the generated characteristic code, that indicates the plurality of identified attributes that correspond to the requested network service, to a plurality of API records that are each associated with a respective set of APIs,
wherein each API record, of the plurality of API records, includes a respective characteristic code associated with the each API record, the characteristic code for each API record indicating a respective set of attributes associated with the set of APIs associated with the each API record, and
selecting, based on the comparing, one or more API records that each include a same characteristic code as the generated characteristic code that indicates the determined API characteristics that correspond to the requested network service;
generate an API chain, that includes an ordered sequence of the sets of APIs that correspond to the selected one or more API records, for implementing the network service; and
provide the generated API chain to the SDN architecture, wherein providing the generated API chain to the SDN architecture enables the SDN architecture to implement the selected sets of APIs in an order that is based on the ordered sequence to provide the requested network service.

2. The system of claim 1,
wherein executing the processor-executable instructions, to determine the one or more APIs for implementing the network service, causes the one or more processors to determine that the repository includes a particular API record that includes a completed API chain corresponding to the requested network service,
wherein executing the processor-executable instructions, to select the one or more API records, causes the one or more processors to select the completed API chain as the one or more selected API records, and
wherein executing the processor-executable instructions, to generate the API chain, causes the one or more processors to use the selected completed API chain as the generated API chain.

3. The system of claim 1, wherein executing the processor-executable instructions causes the one or more processors to:
create a first API record that associates the request to the generated API chain; and
store the first API record in the repository, the first API record being used to provide API chains for subsequent requests for network services.

4. The system of claim 1, wherein executing the processor-executable instructions, to determine the one or more APIs for implementing the network service, causes the one or more processors to:
determine, based on the request, that an existing API chain exists for the requested network service,
determine, based on the request, that the existing API chain is to be modified, and
modify, based on the request, the existing API chain to create an updated API chain.

5. The system of claim 4, wherein executing the processor-executable instructions causes the one or more processors to:
delete an existing API record corresponding to the existing API chain.

6. The system of claim 1, wherein the request is incomplete as to parameters used to match the request to the API records, and wherein executing the processor-executable instructions further causes the one or more processors to:
when the request corresponds to a unique API record, of the plurality of API records, generate the API chain based on the unique API record, and
when the request corresponds to multiple API records, of the plurality of API records, provide an error message in response to the request.

7. The system of claim 1, wherein executing the processor-executable instructions further causes the one or more processors to:
determine, based on the comparing, that two API records, of the plurality of API records, both match a same characteristic code, of the generated one or more characteristic codes that indicate the determined API characteristics that correspond to the requested network service; and
select a first API record, of the two API records, in lieu of a second API record of the two API records, to include in the selected one or more API records,
wherein the selected set of API records includes the first API record and does not include the second API record.

8. The system of claim 1, wherein executing the processor-executable instructions, to concatenate the identifiers, includes concatenating three or more of the identifiers respectively associated with at least three of the attributes.

9. A method, comprising:
receiving, by an application program interface (API) controller of a software defined network (SDN) node that is hosted in a cloud computing environment, a request for a network service of a wireless telecommunications network that is implemented at least in part by a SDN architecture that includes the SDN node;
determining, based on the request, a plurality of attributes associated with the requested network service;
identifying, for each attribute, of the plurality of attributes, an identifier associated with the each attribute;
generating a characteristic code, that indicates the plurality of identified attributes that correspond to the requested network service, the generating including concatenating the identifiers associated with each attribute to generate the characteristic code;
determining one or more APIs for implementing the network service by:
comparing the generated characteristic code, that indicates the plurality of identified attributes that correspond to the requested network service, to a plurality of API records that are each associated with a respective set of APIs,
wherein each API record, of the plurality of API records, includes a respective characteristic code associated with the each API record, the characteristic code for each API record indicating a respective set of attributes associated with the set of APIs associated with the each API record, and
selecting, based on the comparing, one or more API records that each include a same characteristic code as the generated characteristic code that indicates the determined API characteristics that correspond to the requested network service;
generating an API chain, that includes an ordered sequence the sets of APIs that correspond to the selected one or more API records, for implementing the network service; and
providing the generated API chain to the SDN architecture, wherein providing the generated API chain to implement the selected sets of APIs in an order that is based on the ordered sequence to the SDN architecture enables the to provide the requested network service.

10. The method of claim 9,
wherein determining the APIs for implementing the network service includes determining that the repository includes a particular API record that includes a completed API chain corresponding to the requested network service,
wherein selecting the one or more API records includes selecting the completed API chain as the one or more selected API records, and
wherein generating the API chain includes using the selected completed API chain as the generated API chain.

11. The method of claim 9, further comprising:
creating a first API record that associates the request to the generated API chain; and
storing the first API record in the repository, wherein the API record is used to provide API chains for subsequent requests for network services.

12. The method of claim 9, wherein determining the one or more APIs for implementing the network service includes:

determining, based on the request, that an existing API chain exists for the requested network service,
determining, based on the request, that the existing API chain is to be modified, and
modifying, based on the request, the existing API chain to create an updated API chain.

13. The method of claim 12, further comprising:
deleting an existing API record corresponding to the existing API chain.

14. The method of claim 12, wherein the request is incomplete as to parameters used to match the request to the API records, and the method further comprising:
when the request corresponds to a unique API record, of the plurality of API records, generating the API chain based on the unique API record, and
when the request corresponds to multiple API records, of the plurality of API records, providing an error message in response to the request.

15. The method of claim 9, further comprising:
determining, based on the comparing, that two API records, of the plurality of API records, both match a same characteristic code, of the generated one or more characteristic codes that indicate the determined API characteristics that correspond to the requested network service; and
selecting a first API record, of the two API records, in lieu of a second API record of the two API records, to include in the selected one or more API records,
wherein the selected set of API records includes the first API record and does not include the second API record.

16. The method of claim 9, wherein concatenating the identifiers includes concatenating three or more of the identifiers respectively associated with at least three of the attributes.

17. A non-transitory computer-readable medium storing a plurality of processor-executable instructions, wherein executing the processor-executable instructions causes one or more processors to:
receive, by an application program interface (API) controller of a software defined network (SDN) node that is hosted in a cloud computing environment, a request for a network service of a wireless telecommunications network that is implemented at least in part by a SDN architecture that includes the SDN node;
determine, based on the request, a plurality of attributes associated with the requested network service;
identify, for each attribute, of the plurality of attributes, an identifier associated with the each attribute;
generate a characteristic code, that indicates the plurality of identified attributes that correspond to the requested network service, the generating including concatenating the identifiers associated with each attribute to generate the characteristic code;
determine one or more APIs for implementing the network service by:
comparing the generated characteristic code, that indicates the plurality of identified attributes that correspond to the requested network service, to a plurality of API records that are each associated with a respective set of APIs,
wherein each API record, of the plurality of API records, includes a respective characteristic code associated with the each API record, the characteristic code for each API record indicating a respective set of attributes associated with the set of APIs associated with the each API record, and selecting, based on the comparing, one or more API records that each include a same characteristic code as the generated characteristic code that indicates the determined API characteristics that correspond to the requested network service;

generate an API chain, that includes an ordered sequence of the sets of APIs that correspond to the selected one or more API records, for implementing the network service; and provide the generated API chain to the SDN architecture, wherein providing the generated API chain to the SDN architecture enables the SDN architecture to implement the selected sets of APIs in an order that is based on the ordered sequence to provide the requested network service.

18. The non-transitory computer-readable medium of claim 17,
wherein the processor-executable instructions, to determine the one or more APIs for implementing the network service, include processor-executable instructions to determine that the repository includes a particular API record that includes a completed API chain corresponding to the requested network service,
wherein the processor-executable instructions, to select the one or more API records, include processor-executable instructions to select the completed API chain as the one or more selected API records, and
wherein the processor-executable instructions, to generate the API chain, include processor-executable instructions to use the selected completed API chain as the generated API chain.

19. The non-transitory computer-readable medium of claim 17, further including processor-executable instructions to:
determine, based on the comparing, that two API records, of the plurality of API records, both match a same characteristic code, of the generated one or more characteristic codes that indicate the determined API characteristics that correspond to the requested network service; and
select a first API record, of the two API records, in lieu of a second API record of the two API records, to include in the selected one or more API records,
wherein the selected set of API records includes the first API record and does not include the second API record.

20. The non-transitory computer-readable medium of claim 17, wherein the processor-executable instructions, to concatenate the identifiers, include processor-executable instructions to concatenate three or more of the identifiers respectively associated with at least three of the attributes.

* * * * *